W. BARNETT.
RAIL JOINT.
APPLICATION FILED SEPT. 28, 1909.
960,062.
Patented May 31, 1910.
2 SHEETS—SHEET 2.
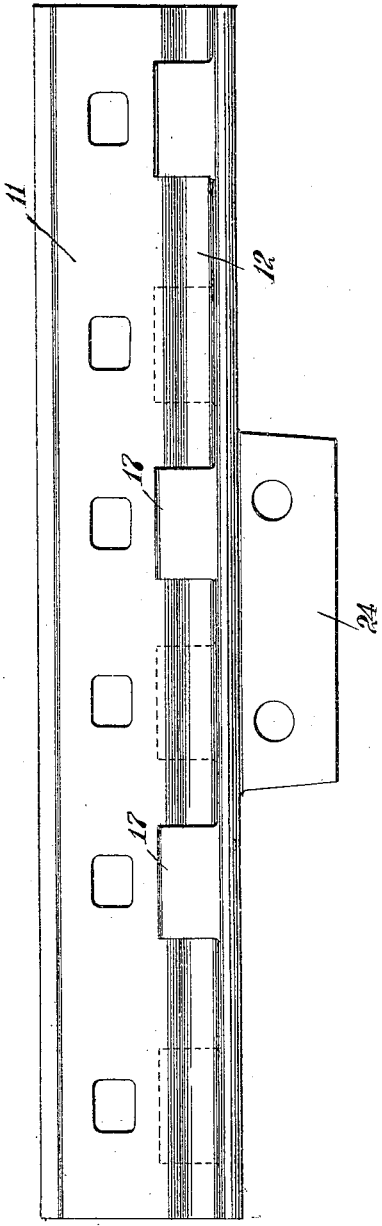
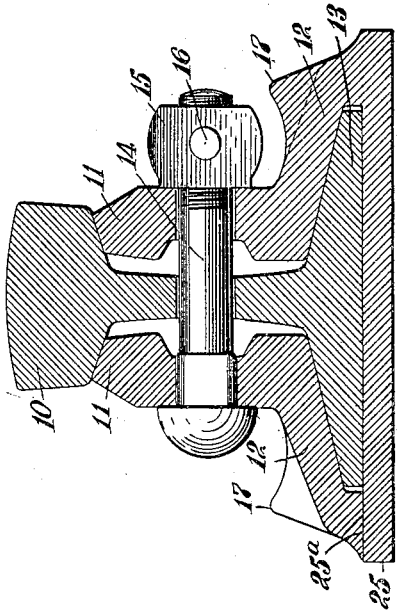
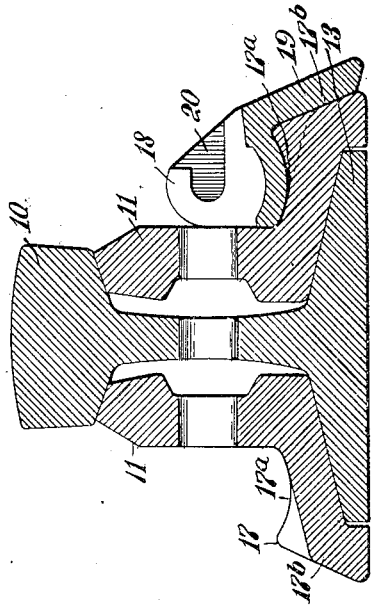
WITNESSES
INVENTOR
Walter Barnett
BY
ATTORNEYS

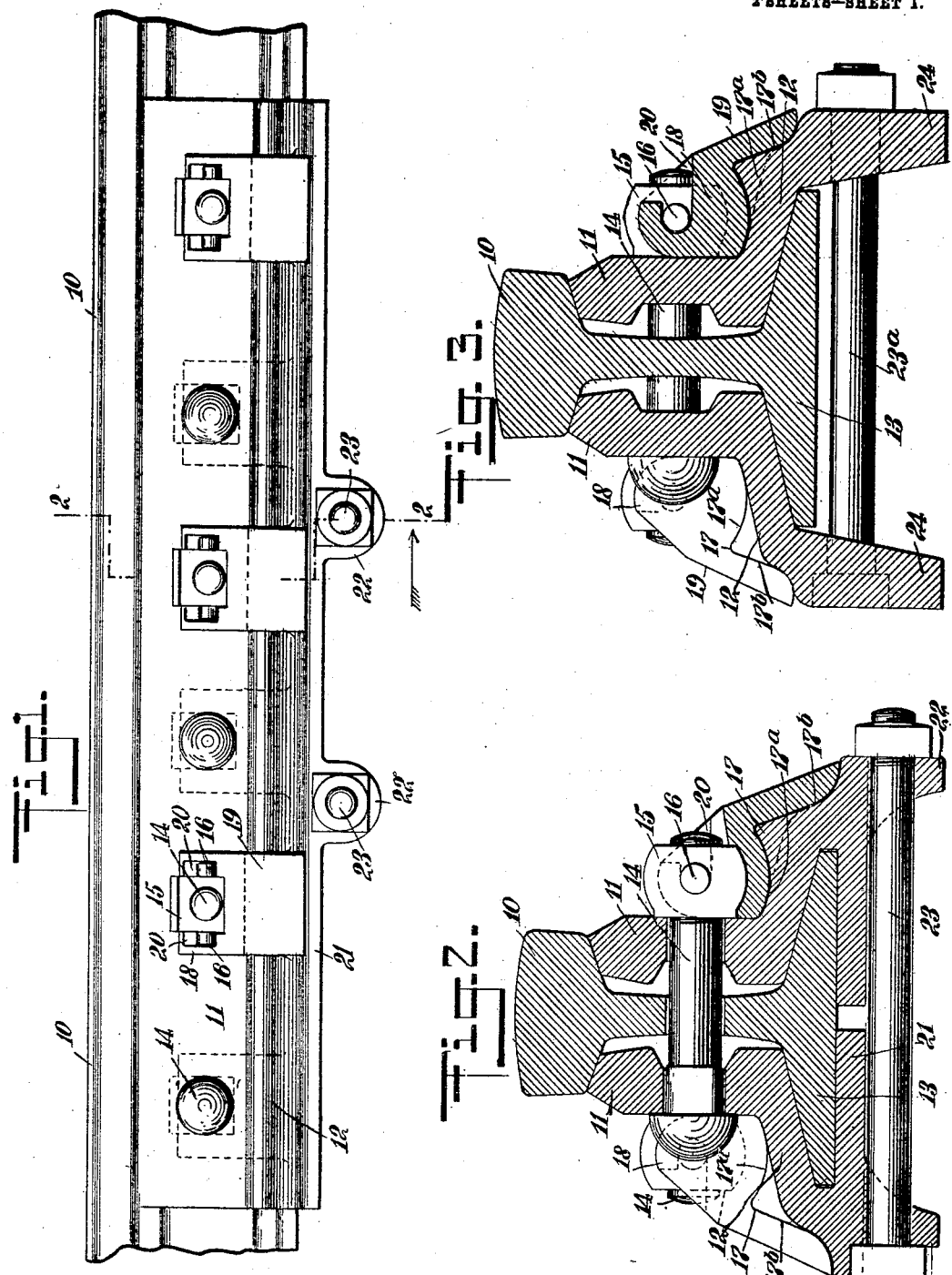

UNITED STATES PATENT OFFICE.

WALTER BARNETT, OF HACKETTSTOWN, NEW JERSEY.

RAIL-JOINT.

960,062.  Specification of Letters Patent.  Patented May 31, 1910.

Application filed September 28, 1909. Serial No. 519,975.

*To all whom it may concern:*

Be it known that I, WALTER BARNETT, a citizen of the United States, and a resident of Hackettstown, in the county of Warren and State of New Jersey, have invented a new and Improved Rail-joint, of which the following is a full, clear, and exact description.

The invention is an improvement in railway rail joints of the character disclosed in Letters Patent Number 793,710, granted to me July 4, 1905, and in which cam-dogs are employed to lock the nuts on the bolts passing through the fish-plates.

The object of the present invention is to so construct the bearings of the cams on the bottom flanges of the fish-plates, that a downward pressure on either the cam or nut will not tend to slide the cam outwardly, but the said flange will operate to support the cam in operative position.

The invention further resides in the arrangement and construction of the cam-dogs.

Reference is to be had to the accompanying drawings forming a part of this specification, in which similar characters of reference indicate corresponding parts in all the views.

Figure 1 is a side view of a railway rail joint constructed in accordance with my invention; Fig. 2 is a section on the line 2—2 of Fig. 1; Fig. 3 is a similar section of a modified form of construction; Fig. 4 is a side view of one of the fish-plates and attached bottom flange, as shown in Fig. 3; Fig. 5 is a cross-section through a joint, showing a further modified form of construction; and Fig. 6 is a similar section, showing a still further form of construction.

The rails 10, 10, arranged end to end and between which the joint is formed, are shown to be of the conventional construction, and in that form of my invention shown in Figs. 1 and 2, fish-plates 11 extend longitudinally at the opposite sides of the rails, lapping the joint, each fish-plate having outwardly-extending bottom flanges 12 overlying and seating on the base flanges 13 of the rails. Passing through the fish-plates and the webs of the rails and binding the fish-plates together are the usual cross-bolts 14, each having a nut 15 threaded on its outer end, with the nuts alternately arranged at the opposite sides of the rails and each provided with upper and lower rounded faces and trunnions 16 extending from the opposite sides. Directly opposite each bolt 14, the fish-plate 11 adjacent to the nut 15 is provided with an upwardly-projecting rib or portion 17, the rib forming the outer terminus of a rounded seat 17$^a$, and the upper terminus of a downwardly and outwardly-inclined seat 17$^b$. Each of the nuts 15 is engaged by a cam-dog comprising a head 18 and a lever or tail 19, the head being slotted out from the top at approximately right-angles to the tail to receive the nut, and having grooves 20 extending from the outer side of the dog in the inner faces of the upwardly-extending ears produced, to about the center of the head, the grooves being adapted to receive the trunnions of the nut in assembling the dog when the latter is turned to an approximately vertical position. The head of the dog is constructed with a flat inner face to seat against the outer face of the adjacent fish-plate, and is rounded on the under side to conform to and bear on the rounded seat 17$^a$, the lever or tail of the dog resting against the seat 17$^b$, and falling within the outline of the bottom flange of the plate when the tail of the dog is depressed. With the dog thus applied, any downward pressure brought to bear on the nut or head of the dog will be effectively resisted, and the tendency of the dog to slide outwardly and shear off the trunnions 16 will be frustrated by the rib or projection 17. By leaving a thickness of metal at the outer sides of the grooves 20, the trunnions are better protected and obscured from view, while at the same time considerably increasing the strength of the cam-dog at these points.

The bottom flanges 12, as shown in Fig. 2, are each formed integral or otherwise rigid with an inwardly-projecting flange 21 engaging the under side of the base flanges of the rail; and at the intersection of the flanges 12 and 21, downwardly-projecting lugs 22 are provided, arranged at the opposite sides of the joint, through which pass bolts 23, the heads of the latter being let into the metal, as shown in Fig. 2.

The construction of the joint, as shown in Fig. 3, is in all respects the same as that just described, except that the flanges 21 are dispensed with and the bottom flanges 12 of each fish-plate near the center are provided with a downwardly-projecting plate 24, through which the bolts 23$^a$, corresponding to the bolts 23, pass and tie the fish-plates together at the under side of the rail.

The construction shown in Fig. 5 differs from those referred to, in the matter of the bottom flanges 12 of the fish-plates terminating in a plane with the under face of the base flanges of the rails.

In Fig. 6, one of the fish-plates is constructed substantially the same as the fish-plates shown in Fig. 5, and the other fish-plate is provided with a flange 25 extending under and in contact with the base flanges of the rails and projecting sufficiently at the opposite side to provide a seat 25ª for the bottom flange of the first mentioned fish-plate.

Having thus described my invention, I claim as new and desire to secure by Letters Patent:

1. The combination of a railway rail, a fish-plate arranged at the side of the rail, a bolt passing through the web of the rail and fish-plate, having a nut, a cam-dog to lock the nut from turning, engaged with the nut and arranged to bear on the fish-plate, and means arranged to engage the under side of the dog at a point outwardly from the fish-plate and prevent the dog from moving outwardly under a downward pressure.

2. The combination of a rail, a fish-plate assembled therewith, a bolt passing through the rail and fish-plate, having a nut provided with trunnions at opposite sides, a cam-dog to prevent the nut from turning, engaged with the trunnions and arranged to bear on the fish-plate, and means to relieve the trunnions of strain when the cam-dog is subjected to a downward pressure.

3. The combination of railway rails arranged end to end, fish-plates overlapping the joint between the rails, having a bottom flange overlapping the base flanges of the rails, with one of the fish-plates provided with an upwardly-projecting portion, a bolt passing through the fish-plates and one of the rails, having a nut, and a cam-dog to lock the nut from turning, engaged therewith and adapted to be engaged by said upwardly-projecting portion of the bottom flange when the dog is moved to operative position.

4. The combination of railway rails arranged end to end, fish-plates overlapping the joint between the rails, having bottom flanges overlapping the base flanges of the rails and provided with upwardly-projecting portions arranged outwardly of the fish-plates, bolts passing through the webs of the rails and the fish-plates, having nuts, and cam-dogs to lock the nuts from turning operatively engaged therewith and arranged to be engaged by said upwardly-projecting portions of the base flanges when the cam-dogs are moved to operative position.

5. The combination of railway rails arranged end to end, fish-plates at the opposite sides of the rails, lapping the joint therebetween, bolts securing the fish-plates together and having nuts, and cams locking the nuts from turning, alternately arranged at opposite sides of the rail and having means coöperative with the fish-plate to hold them against outward movement.

6. The combination of railway rails arranged end to end, fish-plates at the opposite sides of the rails, lapping the joint therebetween, a bolt securing the fish-plates together and having a nut, a cam to lock the nut from turning, and means independent of the nut arranged to engage the cam and hold it against outward movement.

In testimony whereof I have signed my name to this specification in the presence of two subscribing witnesses.

WALTER BARNETT.

Witnesses:
JOHN J. SCOTT,
SAMUEL R. OGDEN.